(12) United States Patent
Li et al.

(10) Patent No.: US 11,223,186 B2
(45) Date of Patent: *Jan. 11, 2022

(54) UTILITY CONDUIT SYSTEM

(71) Applicant: Hubbell Incorporated, Shelton, CT (US)

(72) Inventors: Jian Hua Li, Bayside, NY (US); Sorin Mortun, Irvington, NY (US); Joseph Cretella, Ansonia, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,454

(22) Filed: Aug. 5, 2019

(65) Prior Publication Data
US 2019/0356119 A1  Nov. 21, 2019

Related U.S. Application Data

(63) Continuation of application No. 15/937,286, filed on Mar. 27, 2018, now Pat. No. 10,381,811.

(60) Provisional application No. 62/478,321, filed on Mar. 29, 2017.

(51) Int. Cl.
| | |
|---|---|
| *H02G 3/02* | (2006.01) |
| *H02G 3/04* | (2006.01) |
| *H02G 3/12* | (2006.01) |
| *H01R 25/14* | (2006.01) |
| *H01R 13/73* | (2006.01) |
| *H01R 25/00* | (2006.01) |
| *H01R 103/00* | (2006.01) |

(52) U.S. Cl.
CPC ........... *H02G 3/0437* (2013.01); *H01R 13/73* (2013.01); *H01R 25/006* (2013.01); *H01R 25/145* (2013.01); *H02G 3/0456* (2013.01); *H02G 3/128* (2013.01); *H01R 2103/00* (2013.01)

(58) Field of Classification Search
CPC .. H01R 25/162; H01R 25/006; H01R 25/145; H01R 4/64; H02G 3/0437; H02G 3/0456; H02G 3/128; H02G 3/02
USPC .................................................. 439/211, 215
See application file for complete search history.

(56) References Cited

U.S. PATENT DOCUMENTS

| | | | | |
|---|---|---|---|---|
| 4,874,322 A | * | 10/1989 | Dola | H02G 3/0431 439/210 |
| 4,952,163 A | | 8/1990 | Dola | |
| 5,024,614 A | | 6/1991 | Dola | |
| 5,486,650 A | * | 1/1996 | Yetter | H02G 3/10 174/53 |
| 5,730,400 A | * | 3/1998 | Rinderer | F16L 3/24 248/68.1 |
| 5,879,185 A | * | 3/1999 | Handler | H01R 25/164 439/538 |
| 6,186,825 B1 | | 2/2001 | Bogiel | |

(Continued)

*Primary Examiner* — Harshad G Patel
(74) *Attorney, Agent, or Firm* — Michael Best & Friedrich LLP

(57) ABSTRACT

A utility conduit system includes a base having a bottom wall, a first side wall extending from the bottom wall, and a second side wall extending from the bottom wall at least partially defining a channel. Various components can be removably positioned in the base to customize the utility conduit system for a given location. Some components can include a universal mounting bracket, a by-pass unit, and a divider bracket.

20 Claims, 18 Drawing Sheets

(56) References Cited

U.S. PATENT DOCUMENTS

| | | | | |
|---|---|---|---|---|
| 6,291,769 B1* | 9/2001 | Handler | ............... | H02G 3/0437 |
| | | | | 174/66 |
| 6,328,584 B1* | 12/2001 | Follett | .................... | H01R 27/00 |
| | | | | 439/222 |
| 6,384,336 B1* | 5/2002 | VanderVelde | .......... | H02G 3/128 |
| | | | | 174/503 |
| 6,664,467 B1* | 12/2003 | de la Borbolla | ....... | H02G 3/128 |
| | | | | 174/503 |
| 7,009,108 B2* | 3/2006 | Vargas | ................. | H02G 3/0418 |
| | | | | 174/53 |
| 7,052,299 B2* | 5/2006 | Kim | ....................... | H01R 13/70 |
| | | | | 439/211 |
| 7,112,748 B2* | 9/2006 | Hill | ....................... | H02G 3/128 |
| | | | | 174/480 |
| 7,388,163 B2* | 6/2008 | VanderVelde | ........ | H02G 3/0418 |
| | | | | 174/480 |
| 7,544,900 B2* | 6/2009 | Makwinski | .......... | H02G 3/0418 |
| | | | | 174/480 |
| 7,645,935 B1* | 1/2010 | Picard, Jr. | ................ | H02G 3/14 |
| | | | | 174/50 |
| 7,654,841 B2* | 2/2010 | Arflack | ................. | H02G 3/105 |
| | | | | 439/211 |
| 7,789,686 B2* | 9/2010 | Kim | ....................... | H01R 29/00 |
| | | | | 439/218 |
| 10,181,657 B2* | 1/2019 | Ai | .......................... | H01Q 1/246 |
| 10,381,811 B2* | 8/2019 | Li | ......................... | H01R 25/145 |
| 2008/0214030 A1 | 9/2008 | Ohanesian | | |

* cited by examiner

UTILITY CONDUIT SYSTEM

RELATED APPLICATION(S)

This application is a continuation of U.S. patent application Ser. No. 15/937,286, filed Mar. 27, 2018, which is based on U.S. Provisional Application Ser. No. 62/478,321, filed Mar. 29, 2017, the disclosures of which are incorporated herein by reference in their entirety and to which priority is claimed.

BACKGROUND

The present disclosure relates to a utility conduit system.

Utility conduits are used to provide routing and protection for electrical or optical conductors and outlets in wiring of residential, commercial and industrial premises. In certain applications, the conduits are used to run conductors to locations in a room in a covered, organized manner. Utility conduits are increasingly being used in office spaces, where open floor plans do not have as many interior walls and drop ceilings typically used for running cables.

SUMMARY

According to various exemplary embodiments, a utility conduit system includes a base having a bottom wall, a first side wall extending from the bottom wall, and a second side wall extending from the bottom wall at least partially defining a channel. Various components can be removably positioned in the base to customize the utility conduit system for a given location. Some components can include a universal mounting bracket, a by-pass unit, and a divider bracket.

In one example, a utility conduit system includes a base having a bottom wall, a first side wall extending from the bottom wall, and a second side wall extending from the bottom wall at least partially defining a channel. A first protrusion extends from the first side wall into the channel and a second protrusion extends form the second side wall into the channel. A first width is defined by the distance between the first protrusion and the second protrusion. A universal mounting bracket includes a first edge, a second edge, a third edge, and a fourth edge, A major width and a minor width are defined between the second and fourth edges. The major width is larger than the first width and the minor width is smaller than the first width. The universal mounting bracket can be positioned in the channel in a first orientation using the minor width to pass the universal mounting bracket through the first and second protrusions and in a second orientation using the major width to retain the universal mounting bracket beneath the first and second protrusions.

According to another example, a utility conduit system includes a base having a bottom wall, a first side wall extending from the bottom wall, and a second side wall extending from the bottom wall at least partially defining a channel. A first protrusion extends from the first side wall into the channel and a second protrusion extends form the second side wall into the channel. A first width is defined by the distance between the first protrusion and the second protrusion. A by-pass unit includes a by-pass wall forming a first conduit passageway between the first side wall of the base and the by-pass wall and a second conduit passageway between the second side wall of the base and the by-pass wall. The second conduit passageway is isolated from the first conduit passageway. The by-pass unit is removably received in the base.

According to another example, a utility conduit system includes a base having a bottom wall, a first side wall extending from the bottom wall, and a second side wall extending from the bottom wall at least partially defining a channel. A first protrusion extends from the first side wall into the channel and a second protrusion extends form the second side wall into the channel. A first width is defined by the distance between the first protrusion and the second protrusion. A divider bracket positioned in the base for receiving a divider to separate the channel into a first conduit and a second conduit. The divider bracket includes a first portion having a first resilient leg, a second portion having a second resilient leg, and a connection portion connecting the first portion to the second portion. The first resilient leg and the second resilient leg are configured to cooperatively secure a conduit divider therebetween. The connection portion has a width narrower than a width of the first portion and a width of the second portion.

DETAILED DESCRIPTION

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

Figure 1:
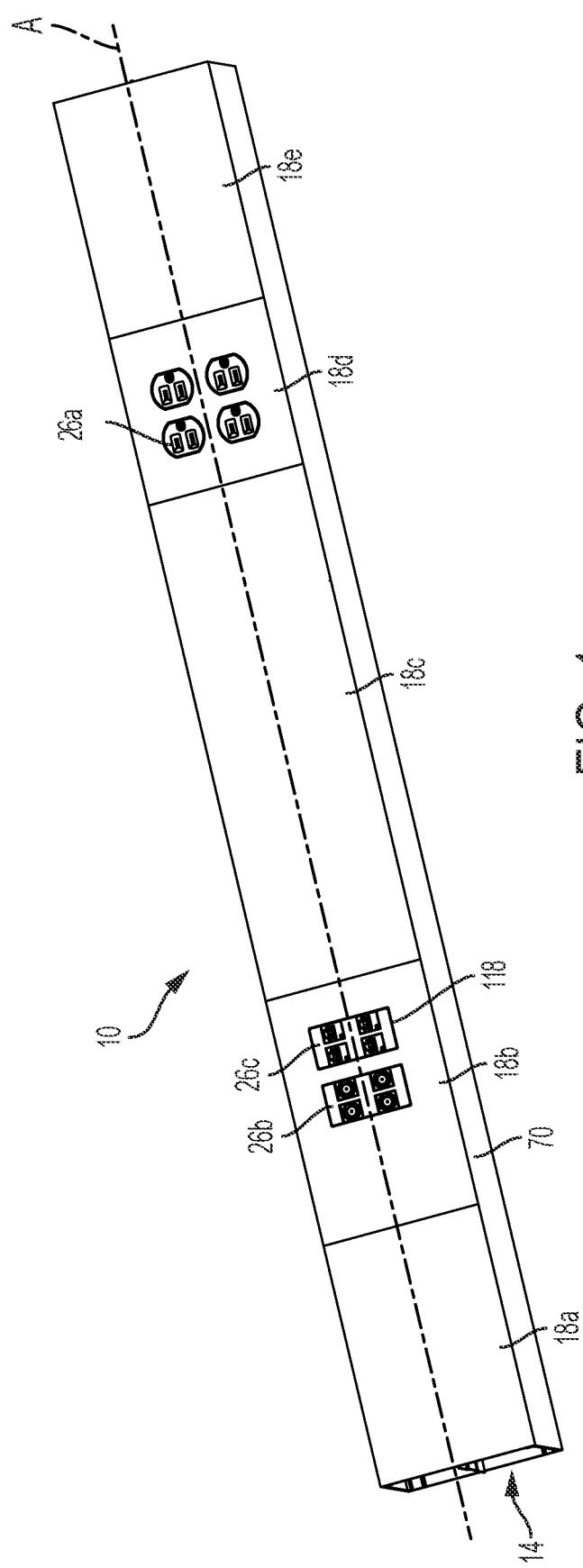
FIG. 1 is a perspective view of an exemplary utility conduit system.
Figure 2:
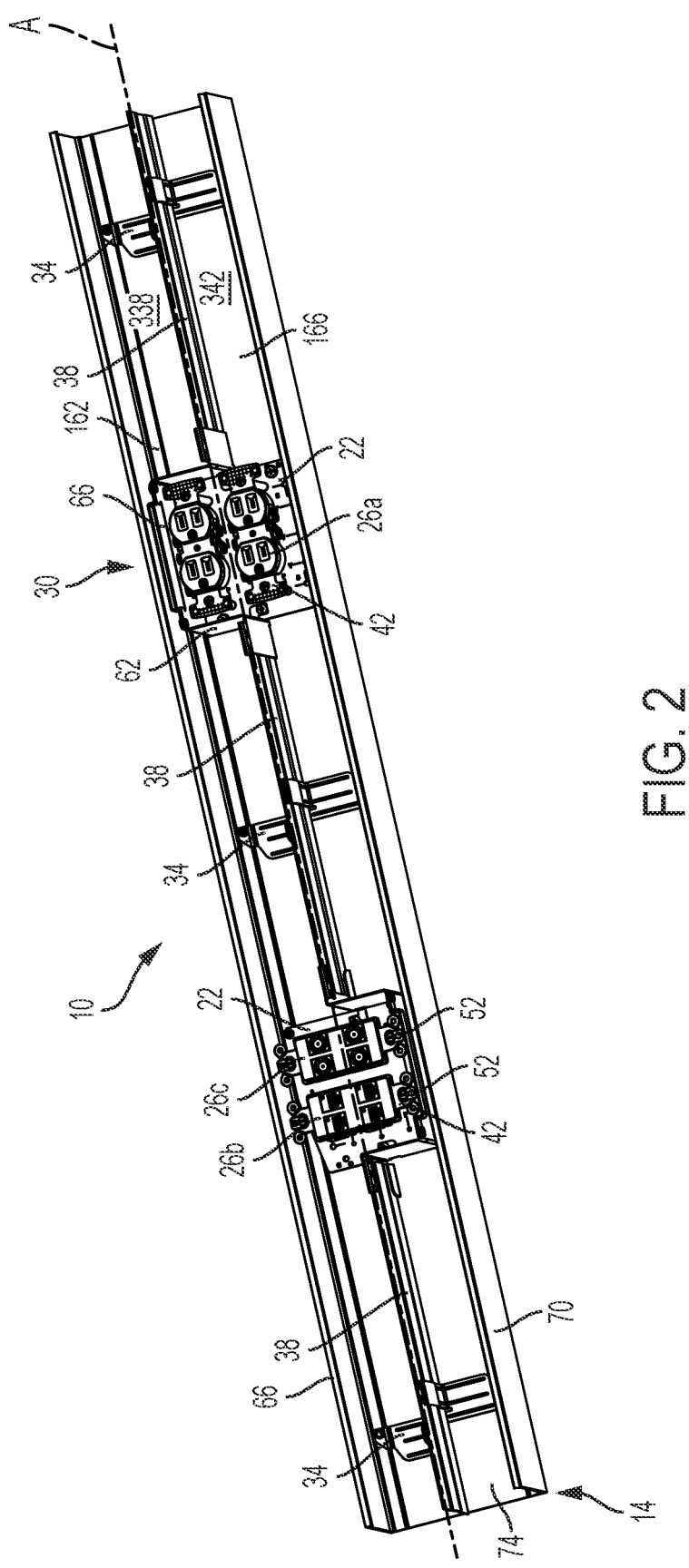
FIG. 2 is a perspective view of the utility system of FIG. 1 with the utility conduit covers removed.

FIGS. 1-2 illustrate an exemplary utility conduit system 10 that includes a base 14 and a cover 18 attached to the base 14. The base 14 and the cover 18 at least partially define a conduit for receiving one or more electrical and structural components. These components can include any combination of a universal mounting bracket 22, an outlet 26, a by-pass unit 30, a divider bracket 34, and a divider 38. In some constructions, the utility conduit system 10 is a raceway configured to extend substantially horizontally along a wall, floor, subfloor, or other structural feature. In other constructions, the utility conduit system 10 is a service pole configured to extend substantially vertically along a wall, post, column, or other structural feature. In some constructions, the length of the base 14 corresponds to the dimensions of a wall along which the base 14 will be installed. In other constructions, the length of the base 14 may correspond to a length or height of a furniture item into which the base 14 is integrated. The depth of the base 14 corresponds to the depth of a subfloor or wall in which the utility conduit system 10 is used.

The utility conduit system 10 can have various sizes, shapes, and configurations according to the location and desired components. In the illustrated construction, the utility conduit system 10 has a 2-gang configuration, meaning that it can receive two outlets 26 positioned side-by-side as shown in FIGS. 1-2. Each of the outlets 26 include mounting straps 42 having holes 46 for receiving fasteners 52. In other constructions, the utility conduit system 10 can have a 1-gang configuration, or a 3-gang or configuration. The outlets 26 can be power outlets 26a, data outlets 26b, cable outlets 26c, or any other type of outlet, such as a pin-and-sleeve outlet.

Figure 3:
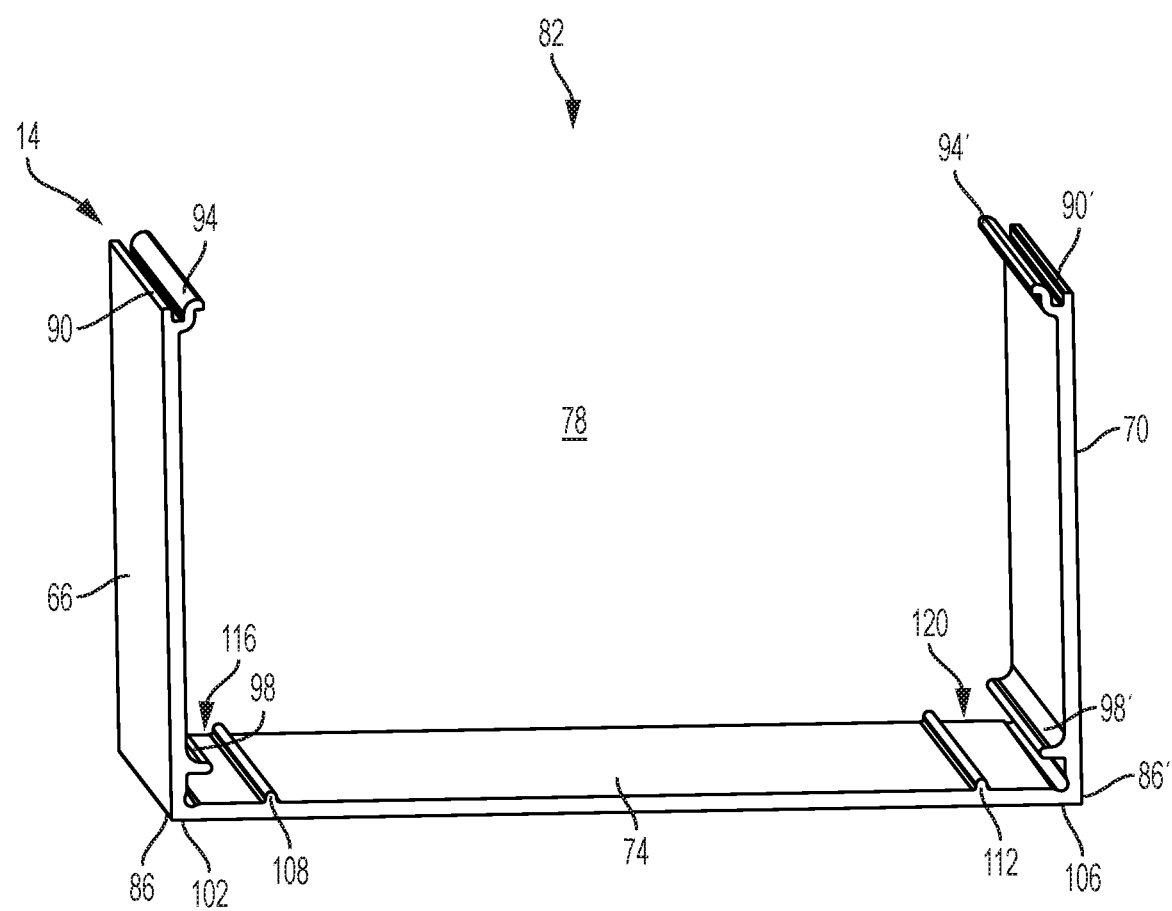
FIG. 3 is a perspective view of a raceway channel of the utility conduit system of FIG. 1.

As shown in FIGS. 2 and 3, the base 14 includes a first sidewall 66, a second sidewall 70, and a bottom wall 74 that at least partially define a channel 78 having a longitudinal channel axis A. The first sidewall 66, the second sidewall 70, and the bottom wall 74 are substantially planar. The bottom wall 74 has a first side 102 adjacent the first sidewall 66 and a second side 106 adjacent the second sidewall 70. The first sidewall 66 is substantially parallel to the second sidewall 70. The first sidewall 66 and the second sidewall 70 are mutually perpendicular to the bottom wall 74. The first sidewall 66 is substantially similar to the second sidewall 70, so only the first sidewall 66 will be described in detail below. Like features of the second sidewall 70 will be indicated with the symbol "'".

As best shown in FIG. 3, the first sidewall 66 includes a first end 86 adjacent the bottom wall 74 and a second end 90 spaced from the bottom wall 74. A hook 94 is formed proximate the second end 90. In the illustrated construction, the hook 94 is substantially S-shaped and extends into the channel 78 and above the second end 90. The hook 94 can extend along a length of the base 14, or a plurality of shorter hooks may be positioned at intervals along the axial length of the base 14.

A wall protrusion 98 is formed proximate and spaced from the first end 86 of the first sidewall 66. The wall protrusion 98 extends into the channel 78 along the axial length of the base 14. A pair of bottom protrusions 108, 112 extend from the bottom wall 74 into the channel 78. The first bottom protrusion 108 is formed in the bottom wall 74 proximate the first side 102 and the second bottom protrusion 112 is formed in the bottom wall 74 proximate the second side 106. The first bottom protrusion 108 and the first wall protrusion 98 cooperatively form a first corner channel 116 therebetween. The second bottom protrusion 112 and the second wall protrusion 98' form a second corner channel 120.

The base 14 may be formed of sheet metal such as aluminum or a plastic material such as PVC. Conduit channels formed of sheet metal may be formed from a single piece of sheet metal that is bent into a substantially C-shaped channel. Alternatively, the base 14 may be made by securing separate wall and base pieces together. If made from PVC, the base 14 is molded as unitary C-shaped channel.

Figure 11:
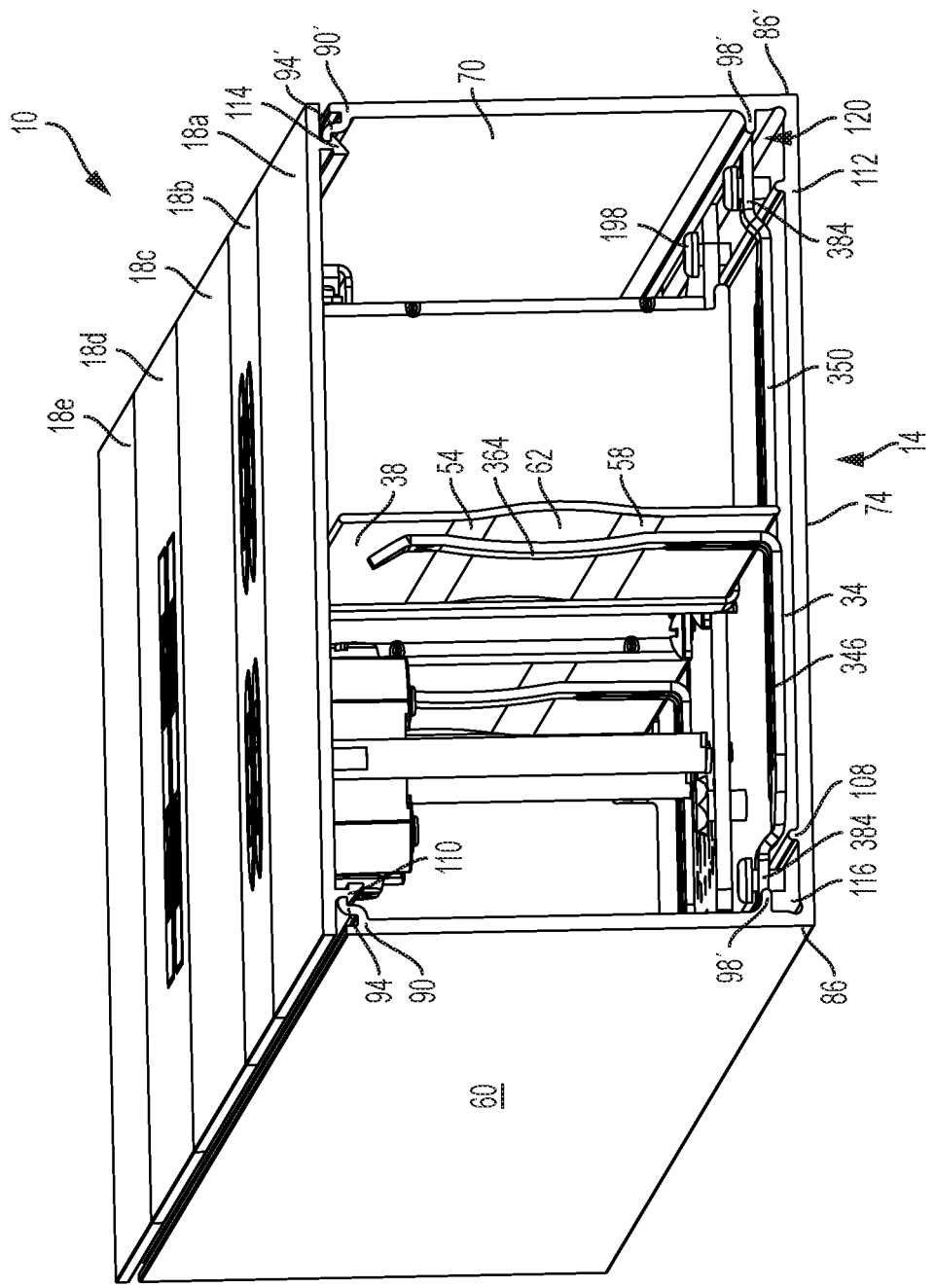
FIG. 11 is a section view of the utility conduit system of FIG. 1 taken along the line 11-11 of FIG. 1

As shown in FIGS. 1 and 11, the cover 18 is engaged with the base 14 to form an enclosed channel 78. A first barb 110 is positioned proximate a first end 86 of the cover 18 and a second barb 114 is positioned proximate a second end 90 of the cover 18. The first barb 110 and the second barb 114 are resilient. The first barb 110 engages the hook 94 and the second barb 114 engages the hook 94 to secure the cover 18 to the base 14. The cover 18 may include openings 118 sized to receive the outlets 26. As shown in FIG. 1, the openings 118 are shaped to correspond to a shape of the outlet 26. For example, in some constructions, the openings 118 may be square to receive outlets having a square profile, such as the information outlets 26b or the cable outlets 26c shown in FIGS. 1-2. In other constructions, the openings 118 may have two opposed straight sides and two opposed curved sides, as shown in the power outlets 26c shown in FIGS. 1-2. As shown in FIG. 1, the cover 18 is formed from a plurality of cover pieces 18a-e. A length of each of the cover pieces 18a-e is shorter than the axial length of the base 14 so that a portion of the channel 78 may be opened without exposing the entire length of the channel 78. In some constructions, the cover 18 is made from sheet metal such as aluminum. In other constructions, the cover 18 is made from a plastic material such as PVC.

Figure 4:
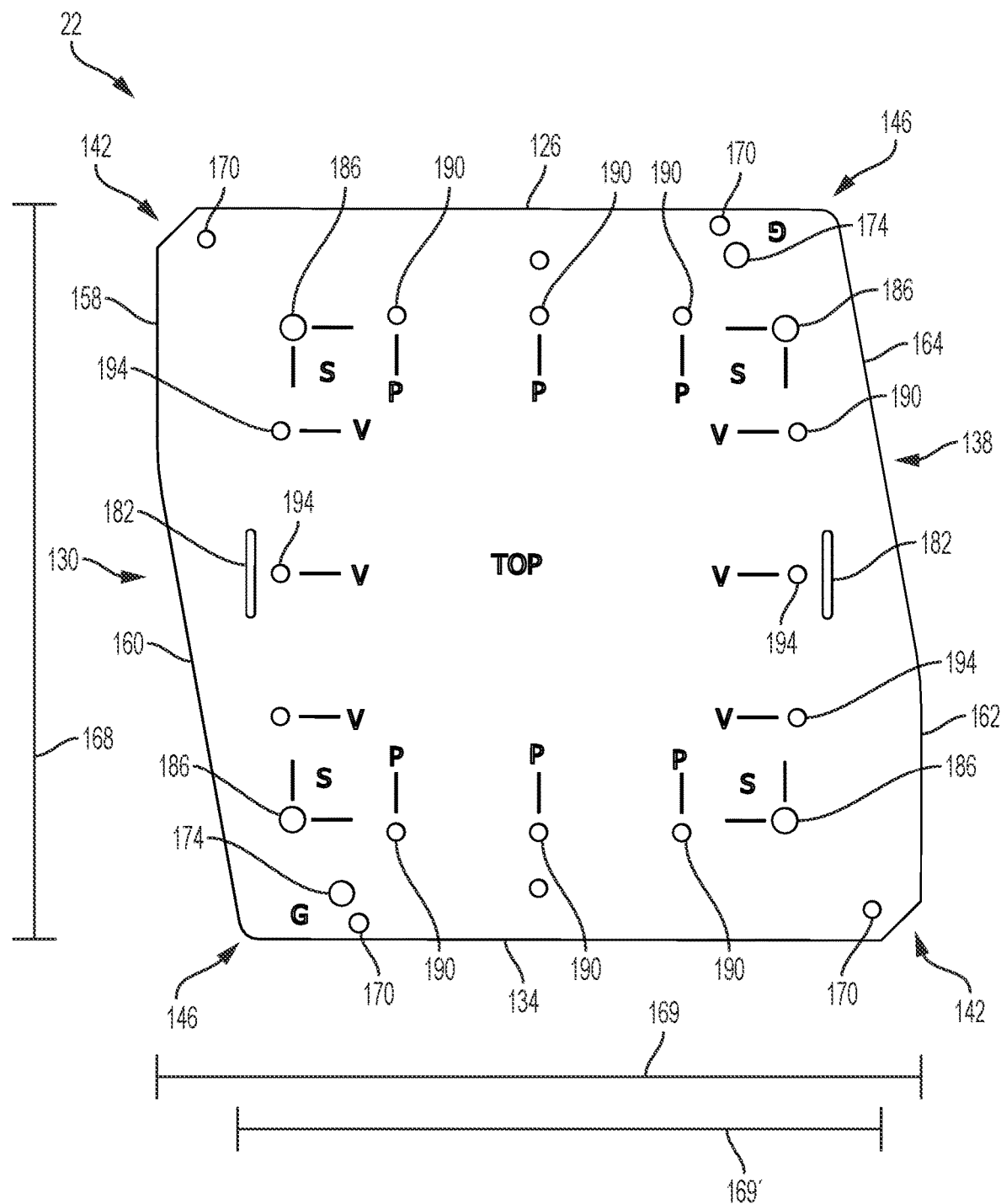
FIG. 4 is a top view of an exemplary universal mounting bracket for use with the utility conduit system of FIG. 1.

FIG. 4 illustrates an exemplary embodiment of the universal mounting bracket 22. The universal mounting bracket 22 is substantially planar and includes a first edge 126, a second edge 130, a third edge 134, and a fourth edge 138. The first edge 126 is opposite and substantially parallel to the third edge 134. The second edge 130 is opposite the fourth edge 138. The second edge 130 includes a first portion 158 and a second portion 160. The first portion 158 is substantially perpendicular to the first edge 126. The second portion 160 is angled toward a central axis of the universal mounting bracket 22. The fourth edge 138 includes a first portion 162 and a second portion 164. The first portion 162 is substantially perpendicular to the third edge 134. The second portion 164 is angled toward the central axis. The universal mounting bracket 22 includes two major corners 142 and two minor corners 146. In the illustrated construction, the major corners 142 are chamfered corners and the minor corners 146 are rounded corners.

As shown in FIG. 4, the first edge 126 is spaced a distance 168 from the third edge 134. A major width 169 extends between the major corners 142 as defined by the horizontal distance between the first portion 158 of the second edge 130 and the first portion 162 of the fourth edge 138. A minor width 169' extends between the minor corners 146 as defined by the horizontal distance between the outer edges of the minor corners 146 or the terminus of the second portion 160 of the second edge 130 and the second portion 164 of the fourth edge 138. As illustrated in FIG. 4, the minor width 169' is smaller than the major width 169. This configuration allows the universal mounting bracket 22 to be positioned in at least a first orientation using the minor width 169' and a second orientation using the major width 169, as further discussed below.

Figure 6:
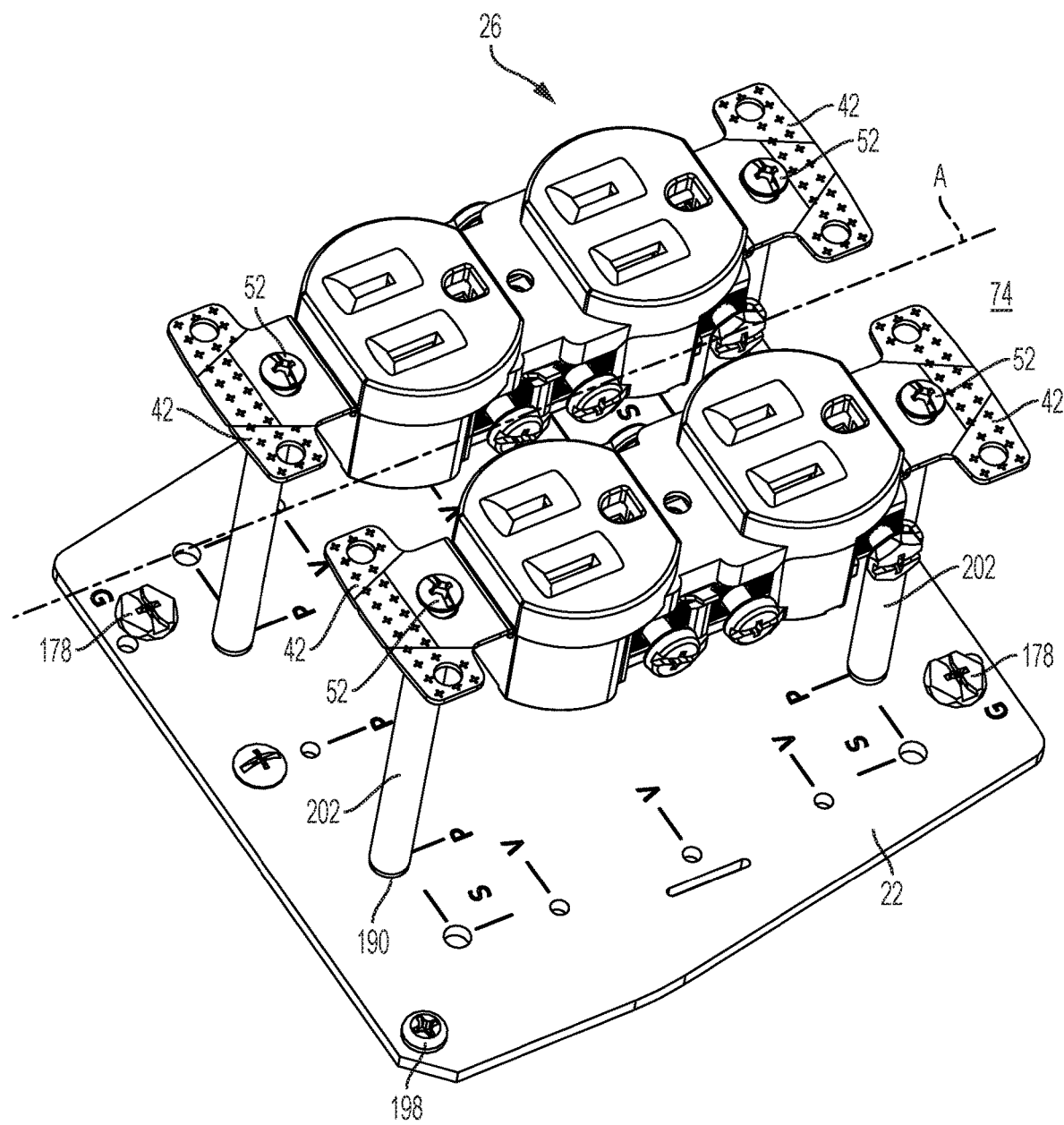
FIG. 6 is a perspective view of a universal mounting bracket engaged with an outlet and a conduit channel according to some constructions.

The universal mounting bracket 22 includes a plurality of openings to facilitate the connection of the universal mounting bracket 22 to a structure and to allow for different components to be connected to the universal mounting plate. For example, connecting holes 170 can be positioned proximate each of the major corners 142 and each of the minor corners 146. The connecting holes 170 can be aligned with the first corner channel 116 and the second corner channel 120 when the universal mounting bracket 22 is positioned within the base 14. The universal mounting bracket 22 includes grounding holes 174 proximate the minor corners 146. The grounding holes 174 are sized to receive grounding screws 178 (FIG. 6). In the illustrated construction, the grounding holes 174 are marked with the letter "G". In alternate constructions, the grounding holes 174 may be positioned elsewhere on the universal mounting bracket 22. The universal mounting bracket 22 includes a pair of by-pass mounting slots 182 for mounting the by-pass unit 30.

The universal mounting bracket 22 also includes different sets of mounting holes that allow different components to be connected to the universal mounting bracket 22 and allow components to be connected in different orientations. Indicia can be used to designate the different mounting hole sets. In an exemplary embodiment, a first plurality of outlet mounting holes 186 are configured to receive an outlet 26 having a square configuration, such as a pin and sleeve outlet. The first plurality of outlet mounting holes 186 is marked with the letter "S". A second plurality of outlet mounting holes 190 are configured to receive an outlet 26 or a plurality of outlets 26 oriented in a direction parallel to the longitudinal axis A of the base 14 (see outlets 26a of FIG. 2). In the illustrated construction, the second plurality of outlet mounting holes 190 is marked with the letter "P". A third plurality of outlet mounting holes 194 are configured to receive an outlet 26 or a plurality of outlets 26 in an orientation that is substantially perpendicular to the longitudinal axis A of the base 14 (see outlets 26b and outlets 26c of FIG. 2). In the illustrated construction, the third plurality of outlet mounting holes 194 is marked with the letter "V". In the illustrated construction, the second plurality of outlet mounting holes 190 and the third plurality of outlet mounting holes 194 are sized for a 2-gang configuration. In alternate constructions, the second plurality of outlet mounting holes 190 and the third plurality of outlet mounting holes 194 may be positioned in alternate configuration to correspond to a 1-gang or a 3-gang (or more than 3-gang) configuration. In some constructions, the universal mounting bracket 22 is made of a stamped metal, such as aluminum. In other constructions, the universal mounting bracket 22 may be made of other materials such as plastic.

Figure 5A:
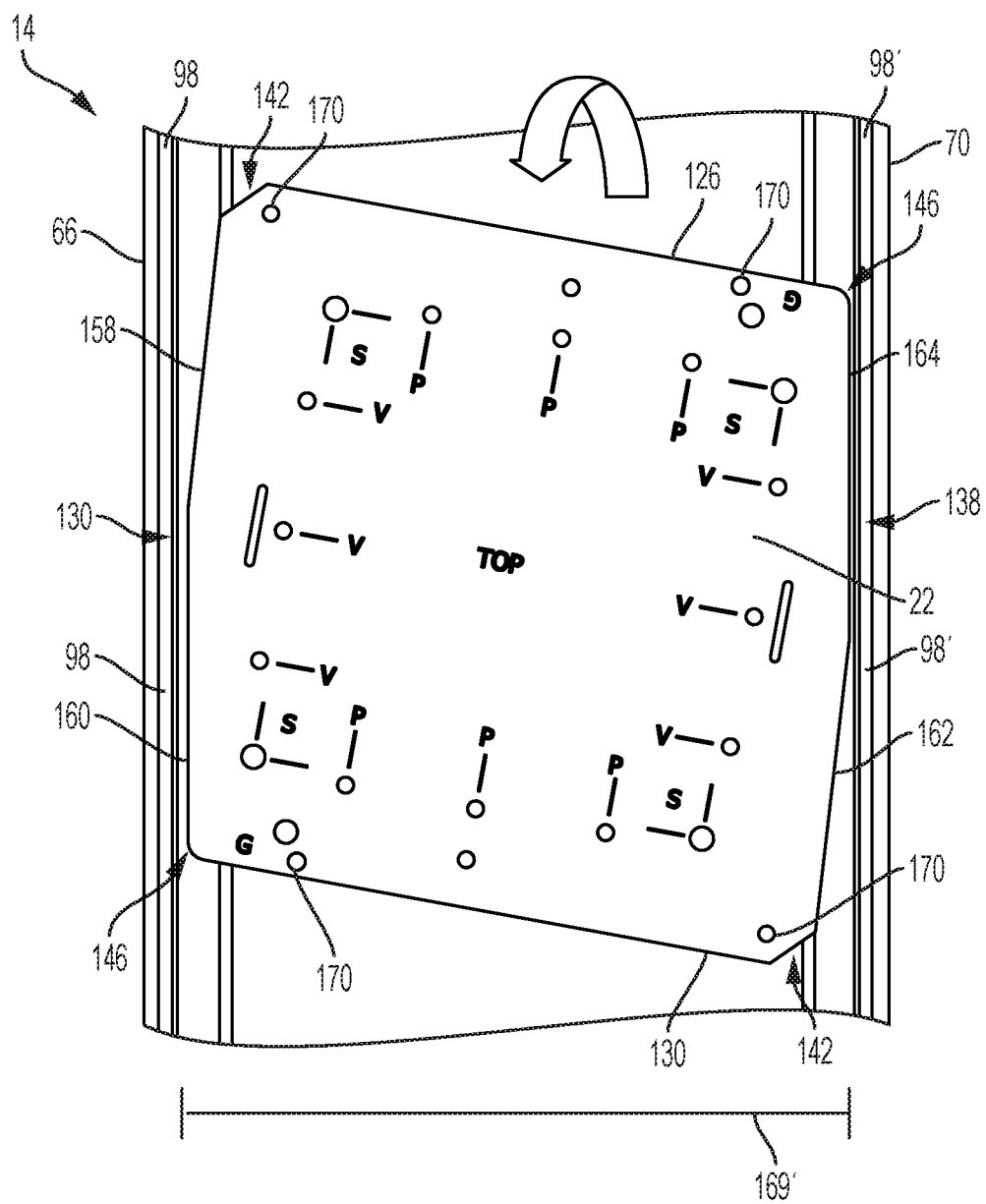
FIGS. 5*a*-5*d* illustrate the steps for installing the universal mounting bracket of FIG. 4.
Figure 5B:
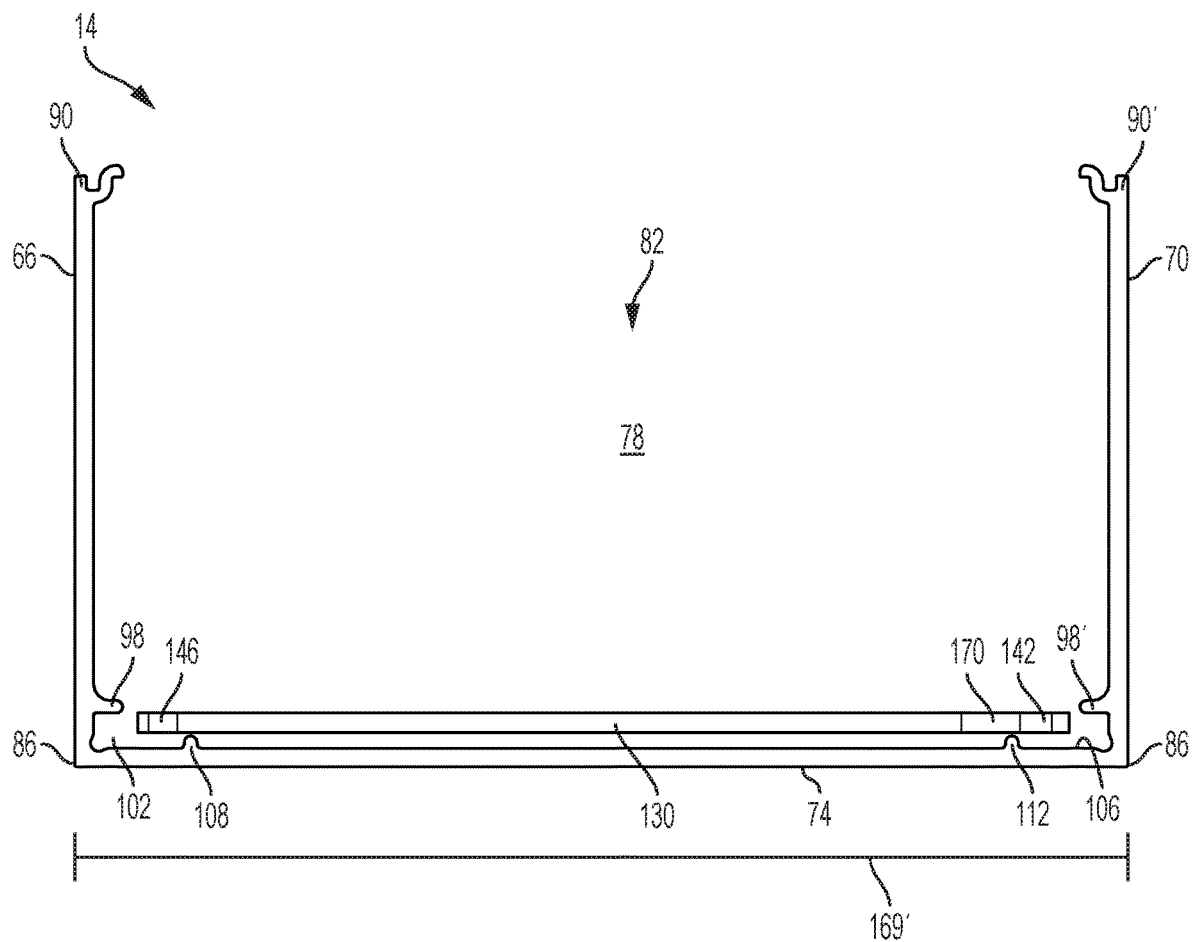
Figure 5C:
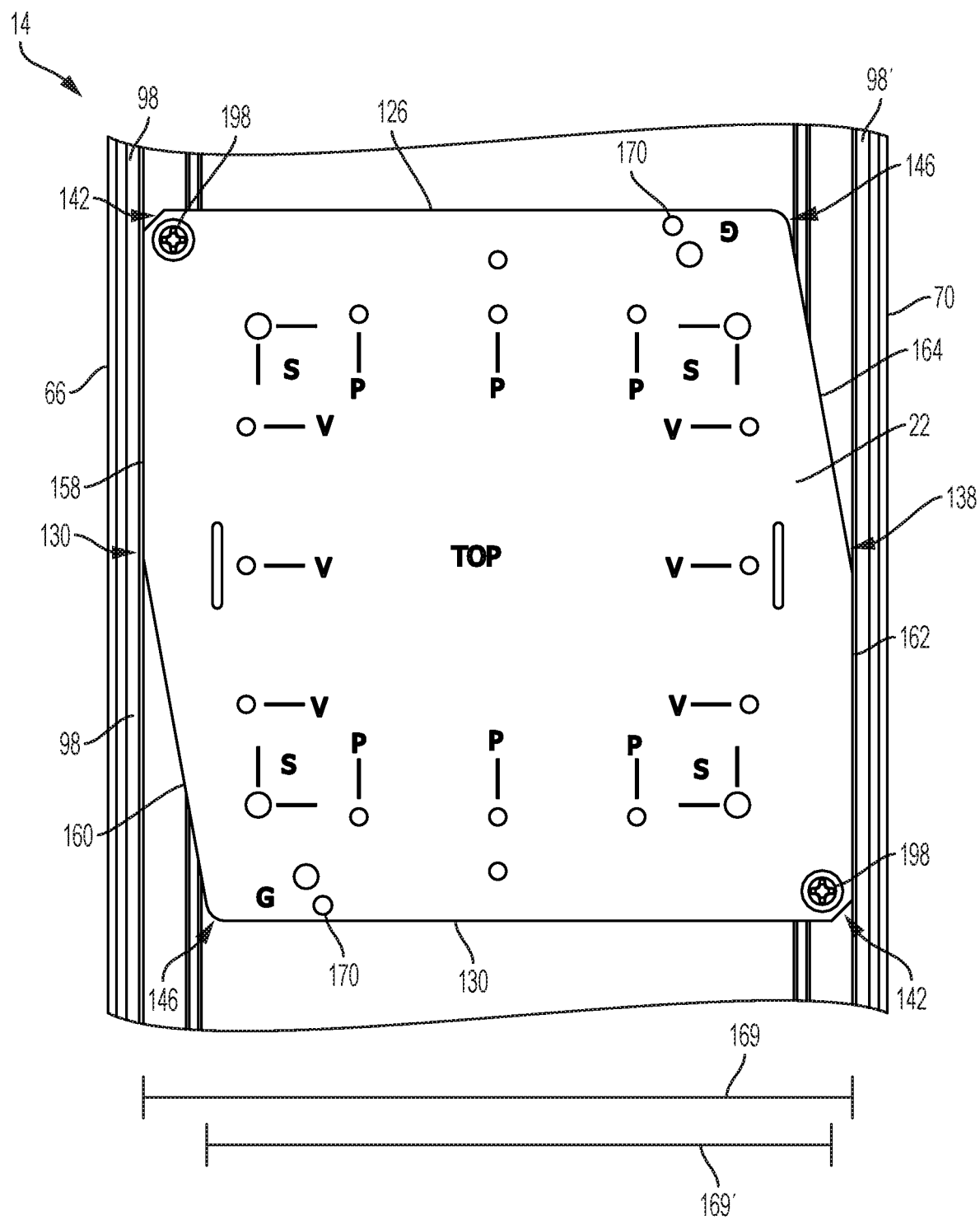
Figure 5D:
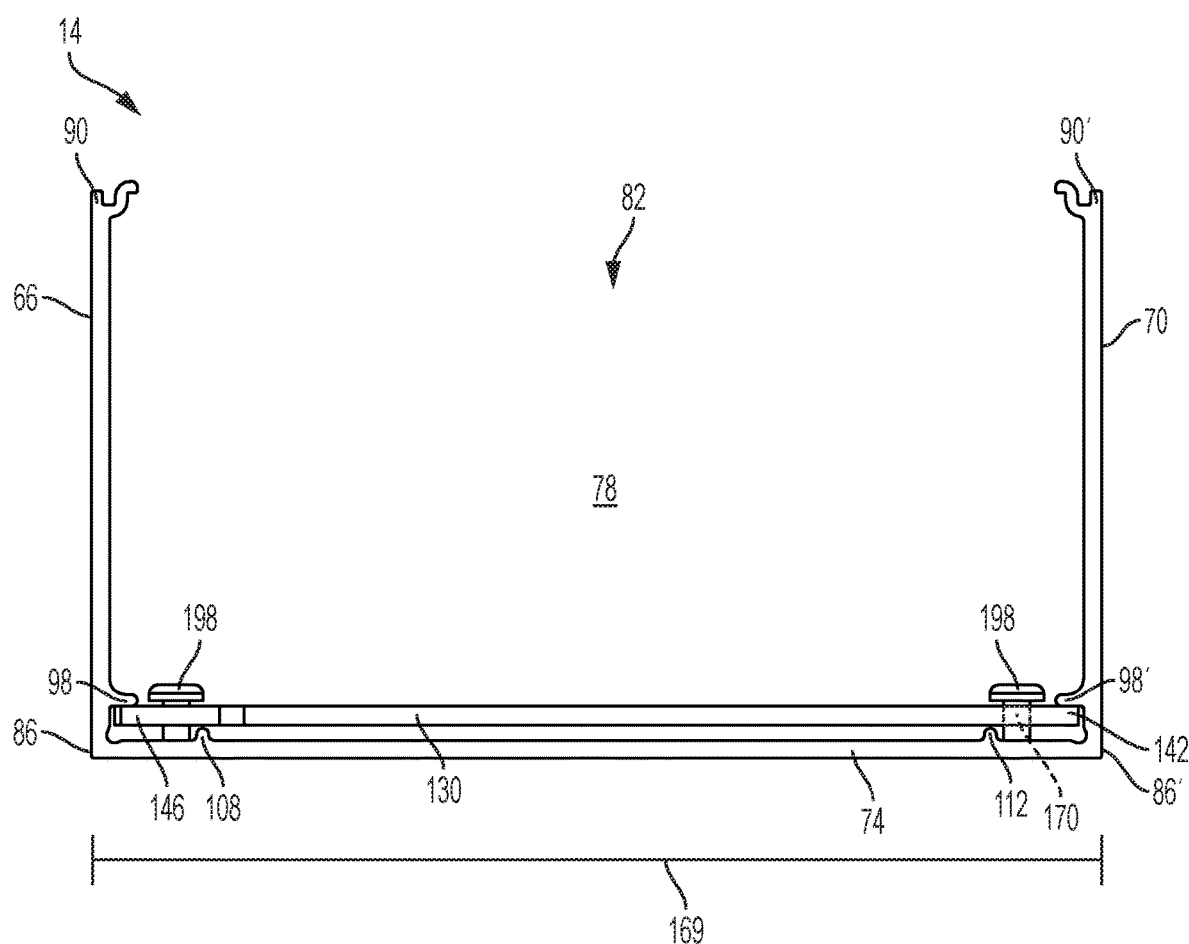

As shown in FIGS. 5a-5d, the second edge 130 and the fourth edge 138 are shaped to allow the universal mounting bracket 22 to be installed in the channel 78 at any position along the longitudinal extent of the channel 78. The universal mounting bracket 22 is positioned in a first orientation so that the second portion 160 of the second edge 130 and the second portion 164 of the fourth edge 138 are substantially parallel to the sidewalls 66, 70 of the base 14. In this position, the minor width 169' is smaller than the distance between the wall protrusions 98, 98' (FIG. 5b). The universal mounting bracket 22 can therefore be positioned within the channel 78 and positioned below the wall protrusions 98, 98' and abutting the bottom protrusions 108, 112. The universal mounting bracket 22 can then be rotated to a second orientation so that the first portion 158 of the second edge 130 and the first portion 162 of the fourth edge 138 are substantially parallel to the sidewalls 66, 70 of the channel 78 (FIG. 5d). The major width 169 is wider than the distance between the wall protrusions 98, 98' so that the bracket extends underneath the wall protrusions 98, 98'. Fasteners 198 are then installed in the connecting holes 170 to secure the universal mounting bracket 22 within the channel 78. As the fasteners 198 are tightened, they extend into the corner channels 116, 120, pushing the universal mounting bracket 22 into engagement with the wall protrusions 98, 98' to secure its position.

FIG. 6 shows the universal mounting bracket 22 connected to the base 14 as described above and a set of power outlets 26 connected to the universal mounting bracket 22. A plurality of standoffs 202 are engaged with the second plurality of outlet mounting holes 190. Each standoff 202 is substantially cylindrical and has a height so that the outlet 26 mounted on the plurality of standoffs 202 is positioned to extend through the openings 118 of the cover 18. A first end 210 of each of the plurality of standoffs 202 includes a threaded portion and is threadably engaged with the second plurality of outlet mounting holes 190. A second end 214 of each of the plurality of standoffs 202 is secured to the mounting strap 42 of the outlet 26 by fasteners 52.

Figure 7:
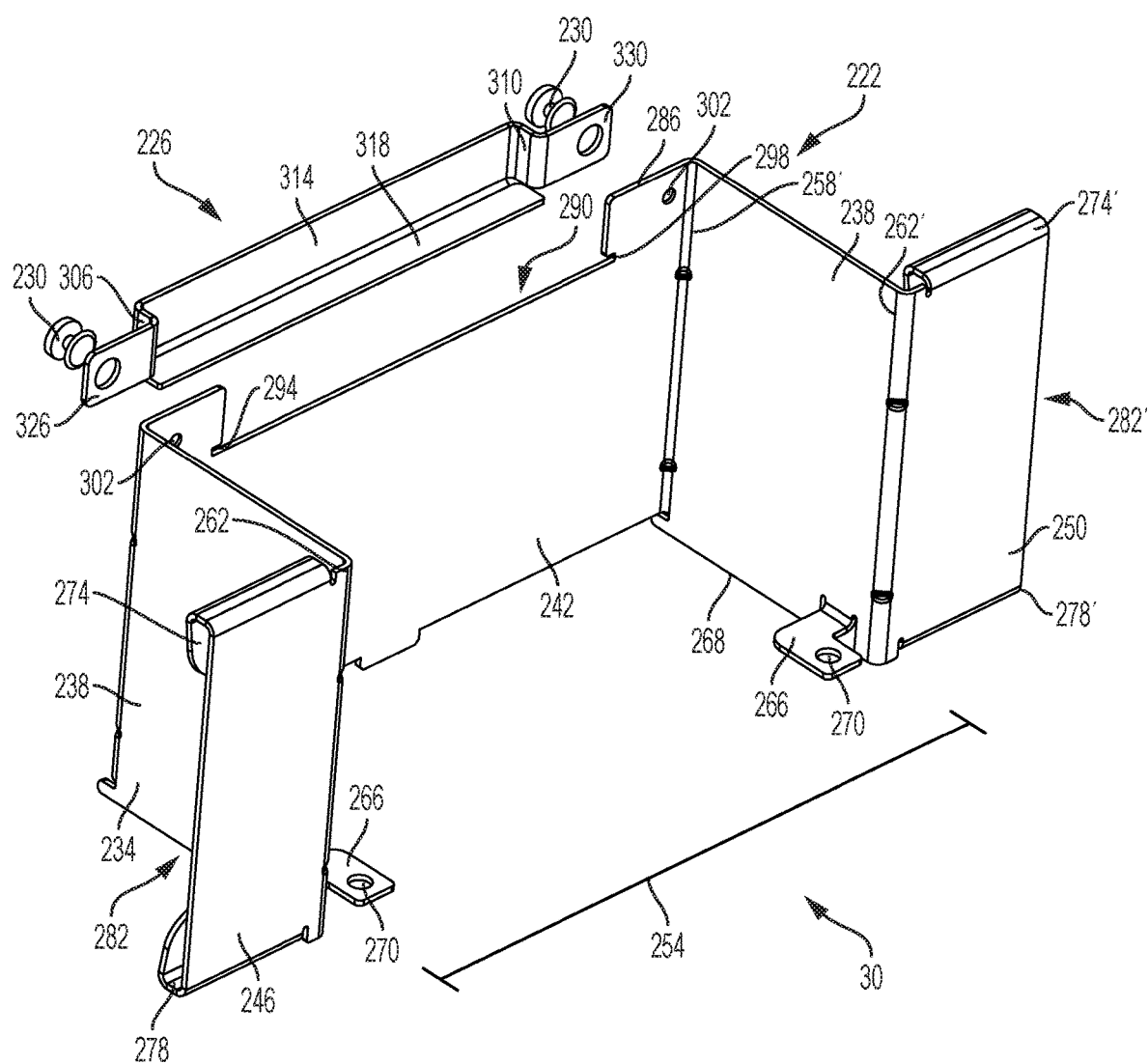
FIG. 7 is an exploded view of a by-pass unit for use with the utility conduit system of FIG. 1.

FIG. 7 shows a by-pass unit 30 that can be installed in the base 14 and used to separate power lines from data/communication lines extending through the channel 78. The by-pass unit 30 includes a by-pass wall 222 and a pocket member 226. In the construction shown in FIG. 7, the pocket member 226 is secured to the by-pass wall 222 using fasteners 230. In alternate configurations, the pocket member 226 may be unitarily formed with the by-pass wall 222 or secured to the by-pass wall 222 by other methods such as welding.

With continued reference to FIG. 7, the by-pass wall 222 includes a first sidewall 234, a second sidewall 238, a back wall 242, a first divider engagement portion 246, and a second divider engagement portion 250. The first sidewall 234 and the second sidewall 238 are adjacent the back wall 242 and are perpendicular to the back wall 242, the first divider engagement portion 246, and the second divider engagement portion 250. An opening 254 between the first sidewall 234 and the second sidewall 238 is configured to receive the universal mounting bracket 22. The first sidewall 234 and the second sidewall 238 are substantially similar and the first divider engagement portion 246 and the second divider engagement portion 250 are substantially similar, so only the first sidewall 234 and the first divider engagement portion 246 will be described in detail below. Like numbers will be used to refer to like parts, and corresponding parts of the second sidewall 238 and the second divider engagement portion 250 will be indicated with the symbol "'".

Figure 8:
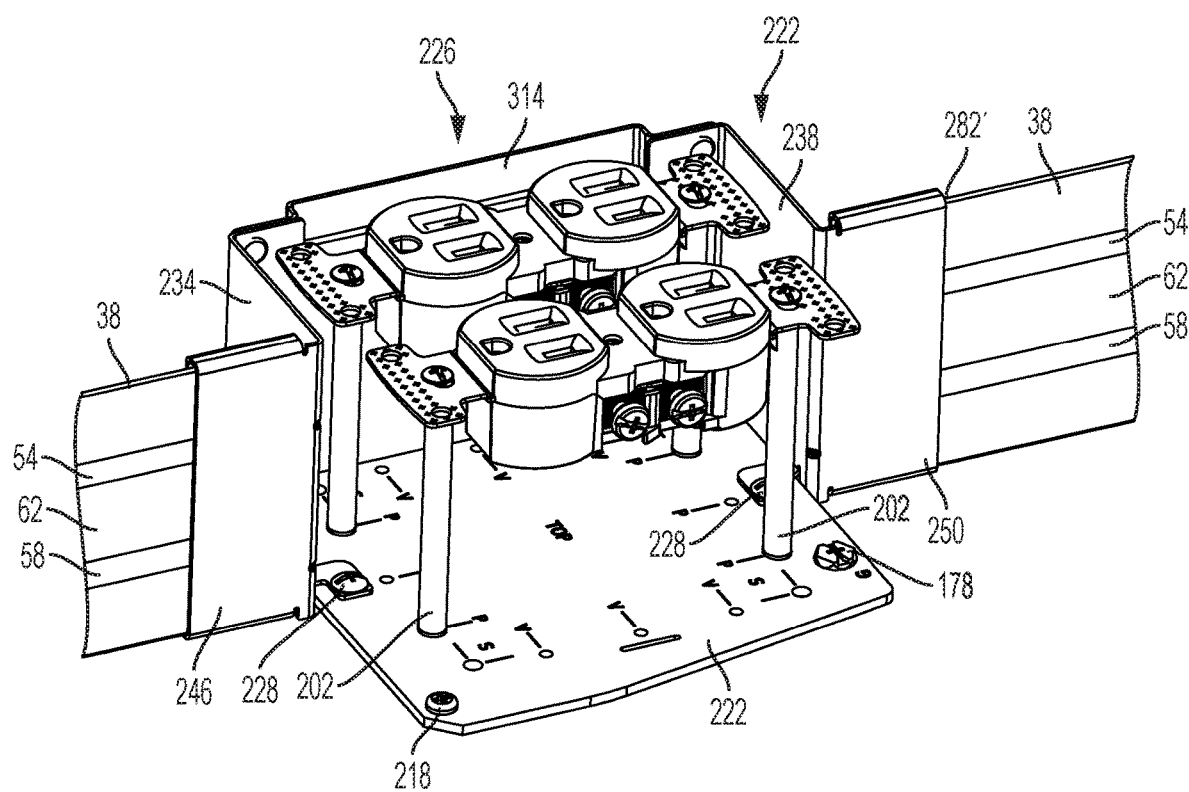
FIG. 8 is a perspective view of a universal mounting bracket engaged with an outlet, a by-pass unit, a divider, and a conduit channel according to some constructions.

The first sidewall 234 has a proximal portion 258 engaged with the back wall 242 and a distal portion spaced from the back wall 242. A mounting tab 266 extends from a lower edge 268 of the first sidewall 234. The mounting tab 266 is positioned so that a mounting hole 270 of the mounting tab 266 can be aligned with the by-pass mounting slot 182 of the universal mounting bracket 22 so that the by-pass unit 30 can be secured to the universal mounting bracket 22 using the fasteners 228 (FIG. 8). The first divider engagement portion 246 extends from the distal portion 262 of the first sidewall 234 and includes a top curved portion 274 and a bottom curved portion 278. A channel 282 sized to receive an end of the divider 38 extends between the top curved portion 274, the bottom curved portion 278, and the first sidewall 234.

A top portion 286 of the back wall 242 incudes a cutout 290. A first track 294 and a second track 298 extend from the cutout 290. The first track 294 and the second track 298 are sized to support and receive the pocket member 226. A mounting hole 302 is positioned on either side of the cutout 290. The pocket member 226 has a first sidewall 306, a second sidewall 310, a back wall 314, and a lower wall 318. The first sidewall 306 and the second sidewall 310 are perpendicular to the back wall 314. The lower wall 318 is perpendicular to the first sidewall 306, the second sidewall 310, and the back wall 314. The pocket member 226 forms a pocket that extends between the first sidewall 306, the second sidewall 310, the back wall 314, and the lower wall 318. The lower wall 318 is received in the tracks 294, 298 of the cutout 290. The tracks 294, 298 are sized to prevent rotation of the pocket member 226 with respect to the by-pass wall 222. A first mounting tab 326 and a second mounting tab 330 extend from the first sidewall 306 and the second sidewall 310, respectively. Each of the mounting tabs 326, 330 includes a mounting hole 334. The mounting holes 334 of the pocket member 226 are aligned with the mounting holes 302 of the by-pass wall 222 to receive the fasteners 230 to secure the pocket member 226 to the by-pass wall 222. In the illustrated construction, the pocket member 226 is made from a metal such as aluminum. In other constructions, the pocket member 226 may be made from other materials such as plastic.

Figure 9:
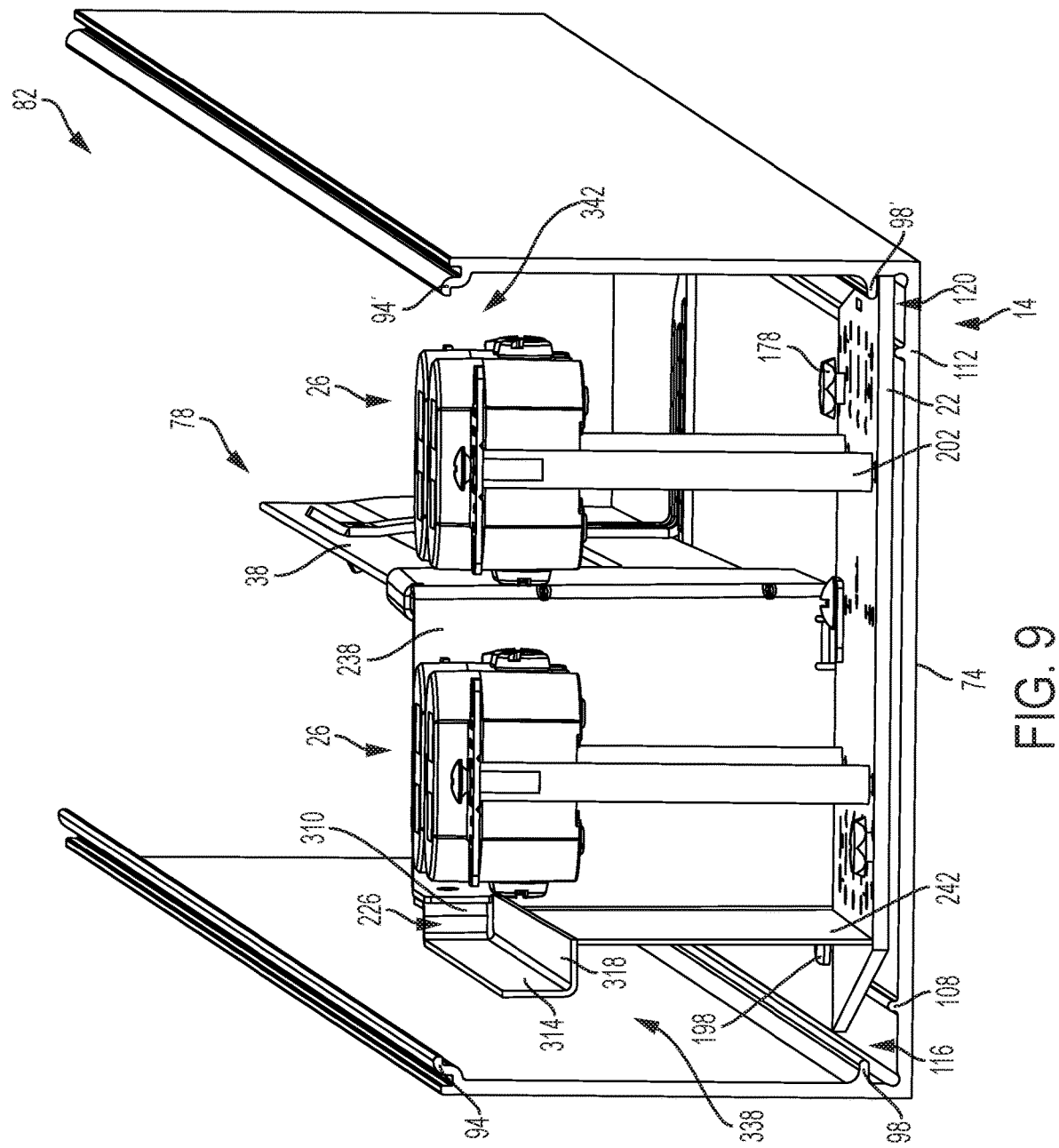
FIG. 9 is a section view of the utility conduit system of FIG. 1 taken along the line 9-9 of FIG. 1.

FIG. 8 shows the by-pass unit 30 connected to the universal mounting bracket 22 and the divider 38 and FIG. 9 shows this assembly positioned in the base 14. The mounting tabs 266 of the by-pass wall 222 are secured to the universal mounting bracket 22 by fasteners 228 and dividers 38 are received by the channels 282, 282' respectively. The divider 38 extends along a length of the base 14 and includes a first groove 54 and a second groove 58 (FIGS. 8 and 11). In the illustrate construction, a portion 62 of the divider 38 that extends between the first groove 54 and the second groove 58 is curved. The divider 38 may be made of sheet metal such as aluminum or of a plastic material, such as PVC.

As best shown in FIG. 9, the dividers 38, and the by-pass unit 30 form a first channel portion 338 and a second channel portion 342 separated or isolated form the first channel portion 338. The first channel portion 338 is at least partially defined between the first sidewall 66 of the base 14 and a first side of the divider 38. The second channel portion 342 is at least partially defined between the second sidewall 70 of the base and a second side of the divider 38. The first channel portion 338 is adapted to receive a first type of utility conductor (in this example data and/or communication) and the second channel is adapted to receive a second type of utility conductor (in this example electrical power wires) and to keep the different utility conductors separated from each other. As shown in FIG. 2, the by-pass unit 30 may be positioned within the channel 78 so that it opens to the first channel portion 338 or the second channel portion 342 as needed. As shown in FIGS. 2 and 8-9, the by-pass unit 30 is shaped so that the second channel portion 342 is able to receive a 2-gang configuration of outlets 26a. The pocket member 226 provides additional space to receive the mounting straps of an outlet oriented perpendicular to the longitudinal axis A of the channel 78 as shown in FIG. 2.

Figure 10:
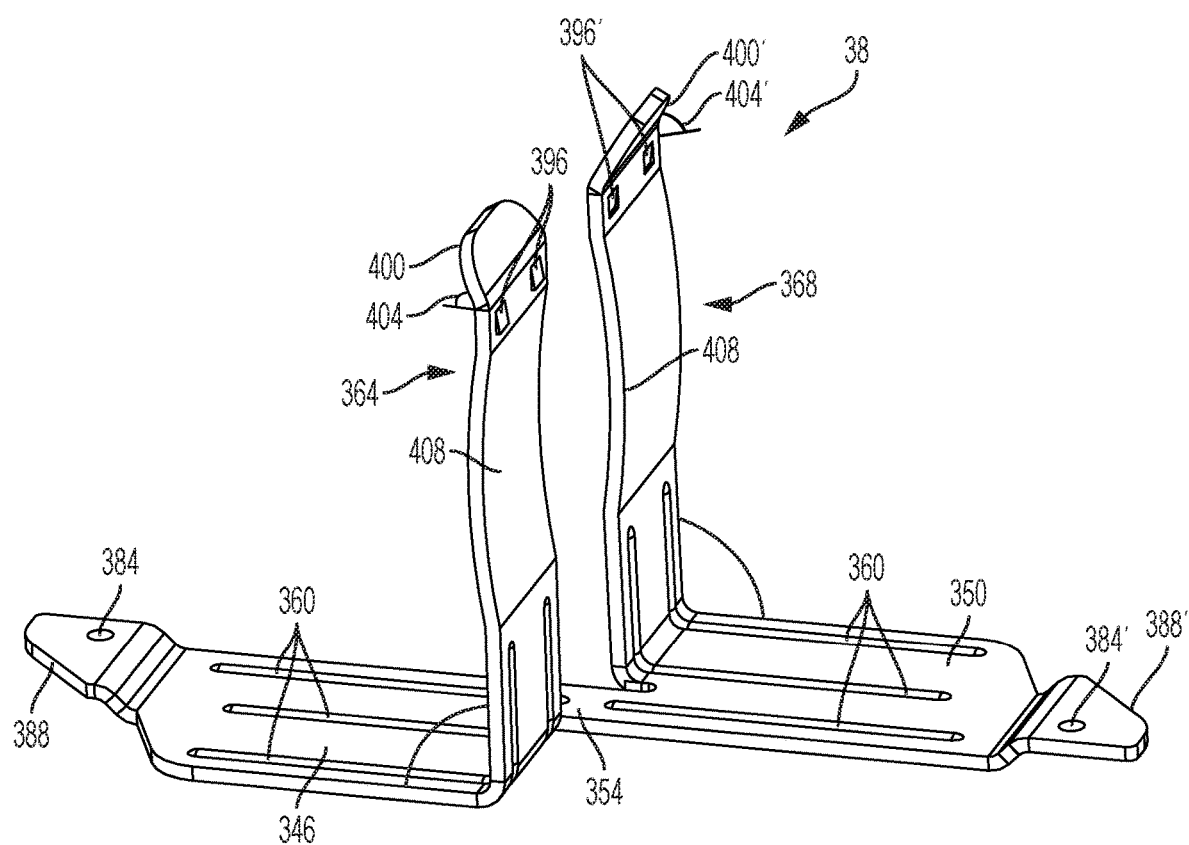
FIG. 10 is a perspective view of a divider bracket for use with the utility conduit system of FIG. 1.

In various constructions, one or more divider brackets 34 can be installed in the base 14 to hold the divider 38 in place. FIG. 10 shows an exemplary divider bracket 34 that includes a first portion 346, a second portion 350, and a narrowed connection portion 356 that connects the first portion 346 to the second portion 350. The first portion 346, the second portion 350, and the narrowed connection portion 356 are substantially coplanar. One or more ribs 360 or raised features, can be provided on the first portion 346 and the second portion 350 to can space the utility wires (not shown) from edges of the divider bracket 34 to help prevent snagging and undue wear. A first leg 364 extends from the first portion 346 and a second leg 368 extends from the second portion 350. In the illustrated construction, the first leg 364 is positioned at an angle 370 with respect to the first portion 346 and the second leg 368 is positioned at the angle 370 with respect to the second portion 350. In the illustrated construction, the angle 370 is a 91° angle. In other constructions, different angles can be used. The angle 370 preloads the first leg 364 and the second leg 368, biasing the first leg 364 and the second leg 368 inward. The word "biasing" is used generally to refer to urging in a specific direction, for example by a mechanical force. The word "inward" is generally used to mean "towards a center of". The first leg 364 and the second leg 368 are substantially similar, so only the first leg 364 is described in detail below. Like parts will be indicated with like numbers and the symbol "'" will be used to indicate parts on the second leg 368.

With continued reference to FIG. 10, the first portion 346 includes a first end 372 and a second end 376. A mounting tab 380 extends from the first end 372 and is vertically spaced from the first end 372. The mounting tab 380 includes a mounting hole 384 and a tapered corner 388. In the illustrated construction, the tapered corner 388 is chamfered. The mounting hole 384 can be aligned with the first corner channel 116 when the divider bracket 34 is positioned within the base 14. The first leg 364 extends from the second end 376 of the first portion 346. The plurality of ribs 360 extends onto a portion of the second leg 368. The first leg 364 includes a plurality of barbs 396 proximate a distal end 400. The distal end 400 of the first leg 364 is angled to be graspable by a user. The plurality of barbs 396 is positioned to grasp a groove 54, 58 of the divider 38 (FIG. 11). The first leg 364 includes a curved portion 408. As shown in FIG. 10, the first leg 364 and the second leg 368 are spaced apart a distance 412 to receive the divider 38 therebetwewen. In the illustrated construction, the divider bracket 34 is made of a stamped metal such as aluminum.

Figure 12A:
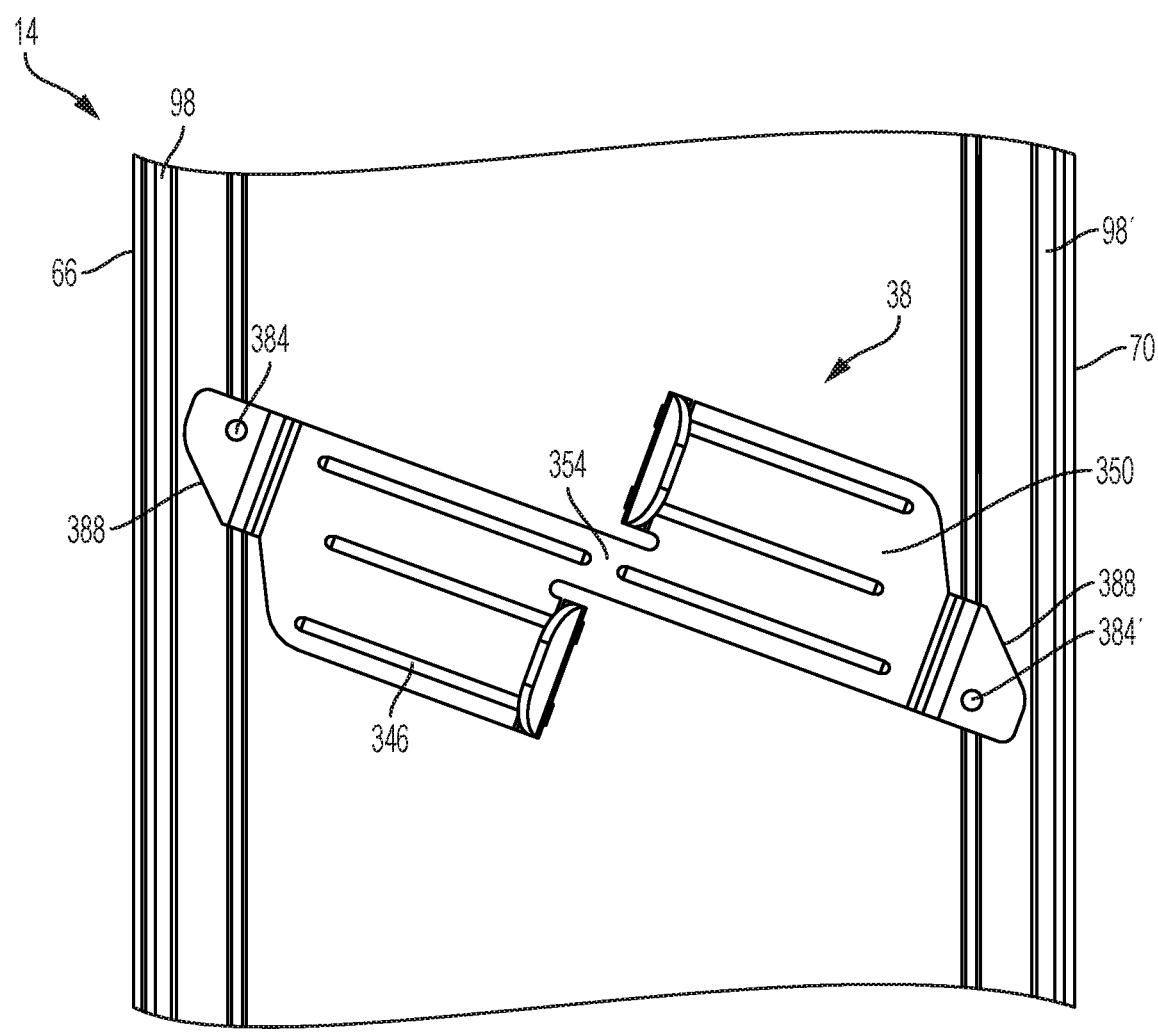
FIGS. 12*a*-12*d* illustrate the steps for installing the divider bracket of FIG. 10.
Figure 12B:
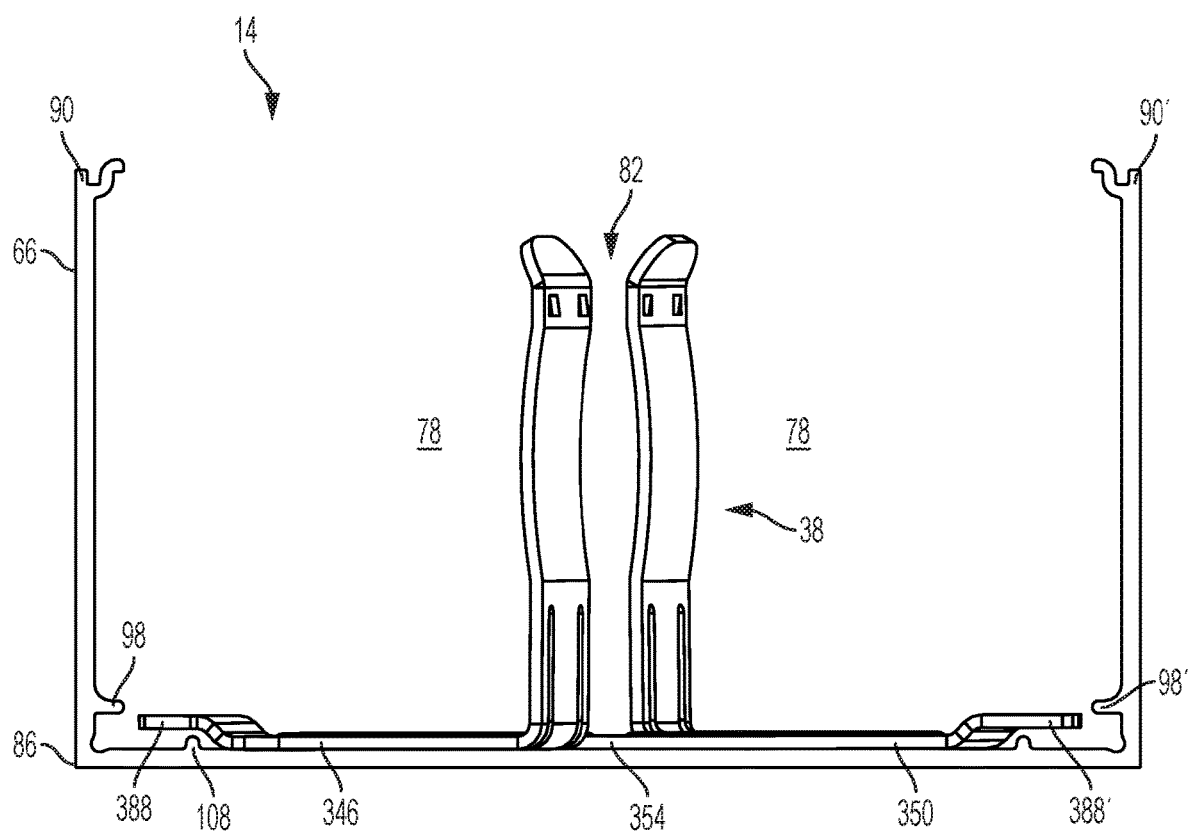
Figure 12C:
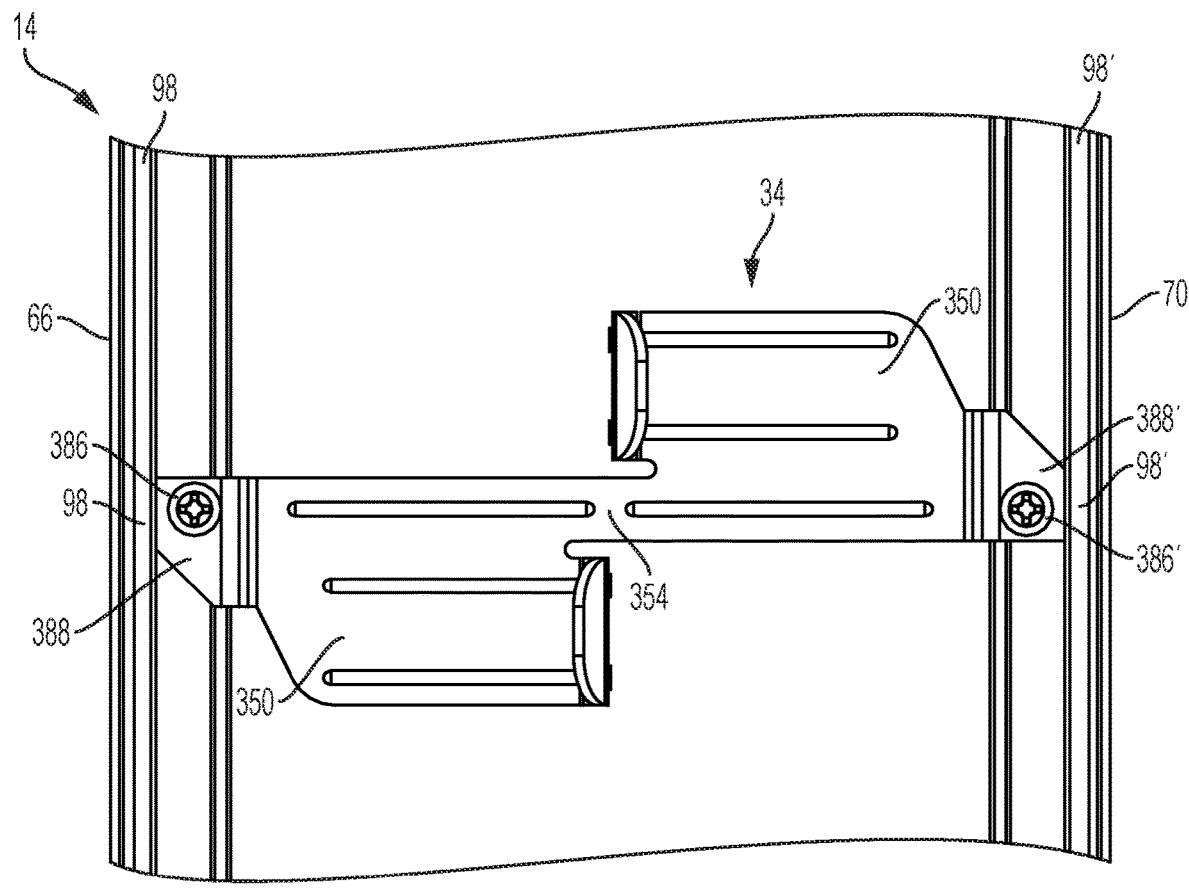
Figure 12D:
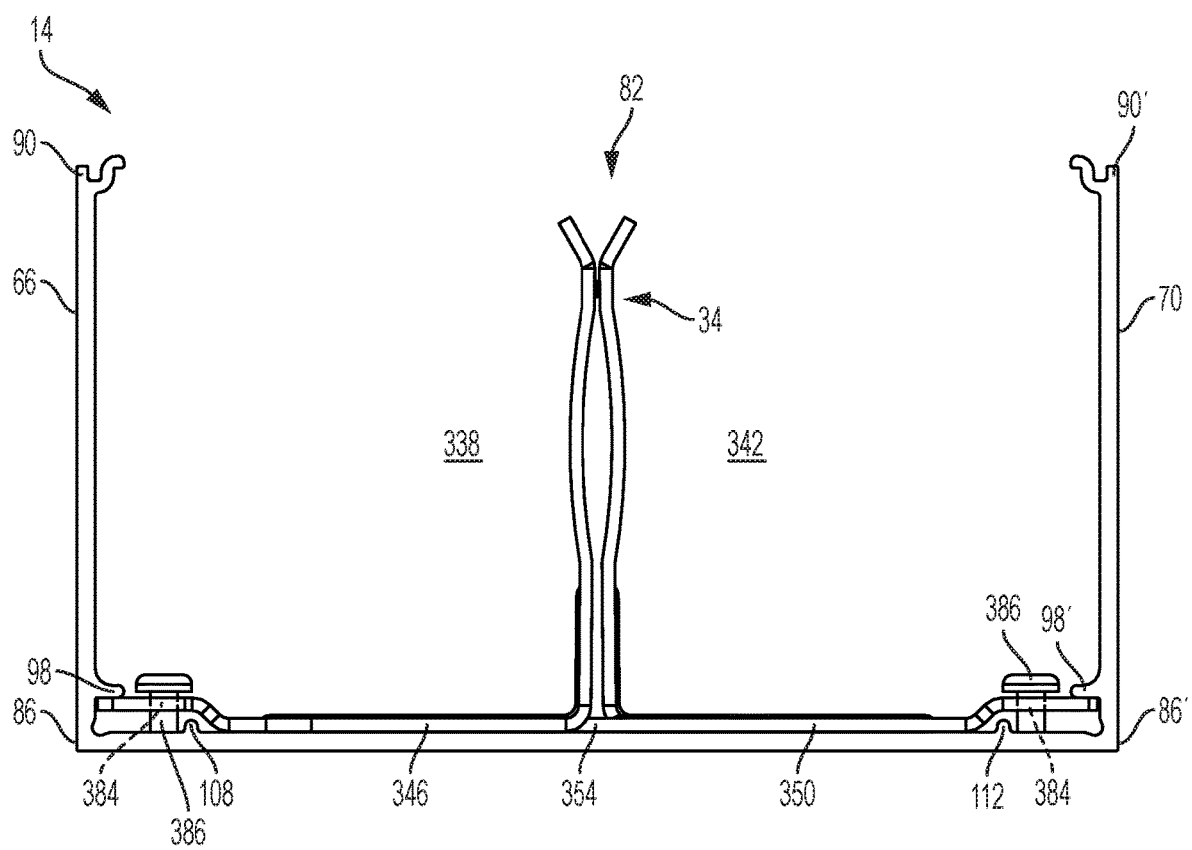

As shown in FIGS. 12a-12d, the shape of the mounting tabs 380, 380' allows the divider bracket 34 to be installed in the channel 78 at any position along the longitudinal extent of the channel 78. To install the divider bracket 34 in the channel 78, the divider bracket 34 is angled within the channel 78 so that the tapered corners 388, 388' are inside the wall protrusions 98, 98' (FIG. 12a). In this position, a width of the divider bracket 34 in a plane substantially perpendicular to the longitudinal extent of the channel 78 is smaller than the distance between the wall protrusions 98, 98' (FIG. 12b). The divider bracket 34 can therefore be positioned within the channel 78 below the wall protrusions 98, 98' and abutting the bottom protrusions 108, 112. After the universal mounting bracket 22 has been positioned in the channel 78, the divider bracket 34 is rotated so that the first portion 158 of the second edge 130 and the first portion 162 of the fourth edge 138 are substantially parallel to the sidewalls 66, 70 of the channel 78 (FIG. 12d). The width of the divider bracket 34 in a plane substantially perpendicular to the longitudinal extent of the channel 38 is wider than the distance between the wall protrusions 98, 98'. As is best shown in FIG. 12d, the divider bracket 34 is secured into position beneath the wall protrusions 98, 98. The fasteners 386 are positioned in the mounting holes 384 of the divider bracket 34. The fasteners 386 extend into the corner channels 116, 120.

In operation, a user positions the base 14 as desired in a room or removes the cover 18 from an installed base 14. When installing the universal mounting bracket 22 in this manner, the user rotates the universal mounting bracket 22 so that the second portion 164 of the second edge 130 and the second portion 164 of the fourth edge 138 are substantially parallel to the first sidewall 66 and the second sidewall 70 of the base 14. The user lowers the universal mounting bracket 22 into the base 14 through the top 86 of the base 14.

The user rotates the universal mounting bracket 22 so that the first edge 126 and the third edge 134 are perpendicular to the longitudinal axis A of the base 14 and the first portion 158 of the second edge 130 and the first portion 162 of the fourth edge 138 are positioned beneath the wall protrusions 98, 98'. The user secures the universal mounting bracket 22 within the corner channels 116, 120 by installing the fasteners 198 through the connecting holes 170.

The user installs the plurality of standoffs 202 in the plurality of outlet mounting holes 186, 190, 194 that corresponds to the user's desired orientation of the outlets 26. For example, to install the outlets 26 in a direction that is parallel to the longitudinal axis A of the base 14, as is shown in FIGS. 5 and 8-9, the user installs the standoffs 202 in the second plurality of outlet mounting holes 190 marked with the letter "P". The user secures the outlets 26 to the standoffs 202 using the fasteners. Optionally, if the user is using the by-pass unit 30, the user aligns the mounting tabs 266 of the by-pass unit 30 with the by-pass mounting slots 182 of the universal mounting bracket 22. The user then secures the by-pass unit 30 to the universal mounting bracket 22. If the user has installed the by-pass unit 30, the user then aligns the dividers 38 with the channels 282, 282' formed in the first divider engagement portion 246 and the second divider engagement portion 250. Next, the user electrically couples the outlets 26 to wires positioned within the base 14. The user then aligns the cover 18 over the top 82 of the base 14 and pushes on the cover 18 until the first barb 110 and the second barb 114 are engaged with the hooks 94, 94.

To install the divider bracket 34, the user positions the base 14 as desired in a room or removes the cover 18 from an installed base 14. Next, the user installs the divider bracket 34 into the base 14. The user rotates the divider bracket 34 so that the first portion 346 and the second portion 350 do not interfere with the wall protrusions 98, 98' of the base 14. The user lowers the divider bracket 34 into the base 14 and then rotates the divider bracket 34 so that the first portion 346 and the second portion 350 are perpendicular to the longitudinal axis A of the base 14. The user secures the divider bracket 34 within the corner channels 116, 120 by installing fasteners through the mounting holes 384.

The divider 38 is inserted into the divider bracket 34 through the angled distal ends 400, 400' of the first leg 364 and the second leg 368. A user can urge the first leg 364 and the second leg 369 apart against the biasing force of the first leg 364 and the second leg 368, or the angled distal ends 400, 400' can direct the bracket 38 between them with only the downward force supplied by the user. When the divider 38 is positioned between the first leg 364 and the second leg 368, the biasing force of causes the first leg 364 and the second leg 368 to grasp the divider 38 therebetween. The user aligns the cover 18 over the top 82 of the base 14 and pushes on the cover 18 until the first barb 110 and the second barb 114 are engaged with the hooks 94, 94'.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed is:

1. A utility conduit system comprising:
a base having a bottom wall, a first side wall extending from the bottom wall, and a second side wall extending from the bottom wall at least partially defining a channel, a first protrusion extending from the first side wall into the channel and a second protrusion extending form the second side wall into the channel, wherein a first width is defined by the distance between the first protrusion and the second protrusion; and
a universal mounting bracket having a major width and a minor width, wherein the major width is larger than the minor width, and wherein the universal mounting bracket can be positioned in the channel in a first orientation using the minor width to pass the universal mounting bracket through the first and second protrusions and in a second orientation using the major width to retain the universal mounting bracket beneath the first and second protrusions, and wherein the universal mounting bracket is rotated less than 90 degrees between the first orientation and the second orientation.

2. The utility conduit system of claim 1, wherein the universal mounting bracket includes a first plurality of mounting holes configured to mount an outlet in a first direction and a second plurality of mounting holes configured to mount the outlet in a second direction different than the first direction.

3. The utility conduit system of claim 1, wherein the universal mounting bracket includes a pair of chamfered corners.

4. The utility conduit system of claim 1, further comprising a by-pass unit securable to the universal mounting bracket.

5. The utility conduit system of claim 1, further comprising an outlet connected to the universal mounting bracket.

6. The utility conduit system of claim 5, wherein a plurality of standoffs connect the outlet to the universal mounting bracket.

7. The utility conduit system of claim 1, further comprising a divider bracket positioned in the channel and configured to receive a divider.

8. The utility conduit system of claim 1, wherein the major width extends between a first major corner of the universal mounting bracket and a second major corner of the universal mounting bracket and the minor width extends between a first minor corner of the universal mounting bracket and a second minor corner of the universal mounting bracket.

9. The utility conduit system of claim 8, wherein connecting holes are positioned proximate each of the major corners and each of the minor corners.

10. A utility conduit system comprising:
  a base having a bottom wall, a first side wall extending from the bottom wall, and a second side wall extending from the bottom wall at least partially defining a channel, a first protrusion extending from the first side wall into the channel and a second protrusion extending form the second side wall into the channel, wherein a first width is defined by the distance between the first protrusion and the second protrusion; and
  a universal mounting bracket configured to be positioned in the channel and connected to the base, the universal mounting bracket having a first plurality of mounting holes configured to mount an outlet in a first direction and a second plurality of mounting holes configured to mount the outlet in a second direction non-parallel to the first direction.

11. The utility conduit system of claim 10, wherein the base includes a first corner channel and a second corner channel and the universal mounting bracket includes a first connecting hole aligned with the first corner channel and a second connecting hole aligned with the second corner channel when the universal mounting bracket is connected to the base.

12. The utility conduit system of claim 11, wherein a fastener is positioned in each of the first and second connecting holes to secure the universal mounting bracket to the base.

13. The utility conduit system of claim 12, wherein the fasteners cause the universal mounting brackets to engage the first protrusion and the second protrusion.

14. The utility conduit system of claim 10, wherein the first plurality of mounting holes are configured to mount an outlet in an orientation parallel to a longitudinal axis of the base and the second plurality of mounting holes are configured to mount an outlet in an orientation perpendicular to the longitudinal axis of the base.

15. The utility conduit system of claim 10, further comprising a plurality of standoffs connected to the universal mounting bracket and an outlet connected to the standoffs.

16. The utility conduit system of claim 10, wherein the universal mounting bracket has a major width and a minor width, wherein the major width is larger than the minor width, and wherein the universal mounting bracket can be positioned in the channel in a first orientation using the minor width to pass the universal mounting bracket through the first and second protrusions and in a second orientation using the major width to retain the universal mounting bracket beneath the first and second protrusions, and wherein the universal mounting bracket is rotated less than 90 degrees between the first orientation and the second orientation.

17. A utility conduit system comprising:
  a base having a bottom wall, a first side wall extending from the bottom wall, and a second side wall extending from the bottom wall at least partially defining a channel, a first protrusion extending from the first side wall into the channel and a second protrusion extending form the second side wall into the channel, wherein a first width is defined by the distance between the first protrusion and the second protrusion;
  a universal mounting bracket configured to be positioned in the channel and connected to the base, the universal mounting bracket having a first connecting hole proximate the first protrusion and a second connecting hole proximate the second protrusion when the universal mounting bracket is positioned in the channel; and
  a first fastener positioned in the first connecting hole and a second fastener positioned in the second connecting hole, wherein the first and second fasteners cause the universal mounting brackets to engage the first protrusion and the second protrusion.

18. The utility conduit system of claim 17, wherein the universal mounting bracket includes a first plurality of mounting holes configured to mount an outlet in a first direction and a second plurality of mounting holes configured to mount the outlet in a second direction different than the first direction.

19. The utility conduit system of claim 18, wherein the first plurality of mounting holes are configured to mount an outlet in an orientation parallel to a longitudinal axis of the base and the second plurality of mounting holes are configured to mount an outlet in an orientation perpendicular to the longitudinal axis of the base.

20. The utility conduit system of claim 17, wherein the universal mounting bracket has a major width and a minor width, wherein the major width is larger than the minor width, and wherein the universal mounting bracket can be positioned in the channel in a first orientation using the minor width to pass the universal mounting bracket through the first and second protrusions and in a second orientation using the major width to retain the universal mounting bracket beneath the first and second protrusions, and wherein the universal mounting bracket is rotated less than 90 degrees between the first orientation and the second orientation.

* * * * *